(12) United States Patent
Duprez

(10) Patent No.: US 10,526,963 B2
(45) Date of Patent: Jan. 7, 2020

(54) COOLING OF TURBINE ENGINE BY EVAPORATION

(71) Applicant: Techspace Aero S.A., Herstal (Milmort) (BE)

(72) Inventor: Vincent Duprez, Bassenge (BE)

(73) Assignee: Safran Aero Boosters SA, Herstal (Milmort) (BE)

( * ) Notice: Subject to any disclaimer, the term of this patent is extended or adjusted under 35 U.S.C. 154(b) by 404 days.

(21) Appl. No.: 15/062,716

(22) Filed: Mar. 7, 2016

(65) Prior Publication Data

US 2016/0273448 A1 Sep. 22, 2016

(30) Foreign Application Priority Data

Mar. 20, 2015 (BE) .................................. 2015/5167

(51) Int. Cl.
*F02C 3/04* (2006.01)
*F02K 3/115* (2006.01)
(Continued)

(52) U.S. Cl.
CPC ................. *F02C 3/04* (2013.01); *F02C 7/16* (2013.01); *F02C 7/18* (2013.01); *F02K 3/115* (2013.01); *F05D 2220/32* (2013.01); *F05D 2260/212* (2013.01); *F05D 2260/22141* (2013.01); *F28D 2021/0021* (2013.01); *Y02T 50/676* (2013.01)

(58) Field of Classification Search
CPC .......... F01D 25/12; F01D 25/18; F01D 25/14; F02C 3/04; F02C 7/16; F02C 7/18; F02K 3/115; F05D 2220/32; F05D 2260/212; F05D 2260/22141; F28D 2021/0021; Y02T 50/676
See application file for complete search history.

(56) References Cited

U.S. PATENT DOCUMENTS

| 5,097,892 A | * | 3/1992 | Beamer | ................... | B64D 33/10 |
| | | | | | 123/41.01 |
| 5,129,446 A | | 7/1992 | Beamer | | |

(Continued)

FOREIGN PATENT DOCUMENTS

| EP | 1916399 A2 | 4/2008 |
| EP | 2075194 A1 | 7/2009 |

OTHER PUBLICATIONS

European Search Report from corresponding Belgium Application No. BE 201505167, dated Nov. 27, 2015.

*Primary Examiner* — Kenneth J Hansen
*Assistant Examiner* — Justin A Pruitt
(74) *Attorney, Agent, or Firm* — Sandberg Phoenix & von Gontard PC

(57) ABSTRACT

An axial turbine engine for an aircraft, in particular a ducted fan turbine engine. The engine comprises an oil circuit with a cooler fitted with a first heat exchange surface in contact with oil of the oil circuit, and a second heat exchange surface in contact with a secondary air flow entering the turbine engine. The cooler is of the air/oil type (ACOC) and comprises fins. To increase the capacity of the cooler, the cooler is fitted with a device for injecting a cooling liquid, e.g., water with additives. The thermal capacity of the water amplifies the cooling. Evacuation of the water increases the thrust of the turbine engine. A method is also provided for cooling the turbine engine of an aircraft by injection of a cooling liquid at the time of take-off.

7 Claims, 2 Drawing Sheets

(51) Int. Cl.
    *F02C 7/18*     (2006.01)
    *F02C 7/16*     (2006.01)
    *F28D 21/00*     (2006.01)

(56) References Cited

U.S. PATENT DOCUMENTS

| | | | |
|---|---|---|---|
| 5,148,859 A | | 9/1992 | Beamer |
| 5,269,135 A | * | 12/1993 | Vermejan ................ F02C 7/04 60/226.1 |
| 8,601,791 B2 | * | 12/2013 | Bajusz ................ F28F 9/0075 60/226.1 |
| 2009/0007570 A1 | | 1/2009 | Ranganathan |
| 2014/0027102 A1 | | 1/2014 | Antel, Jr. et al. |
| 2015/0000865 A1 | | 1/2015 | Ueda |
| 2015/0167555 A1 | * | 6/2015 | Mottet ................ F01D 25/20 60/39.08 |
| 2016/0024968 A1 | * | 1/2016 | Stearns ................ F01D 25/12 60/39.08 |
| 2016/0090861 A1 | * | 3/2016 | Shibukawa ............. F01D 5/10 415/177 |
| 2016/0131036 A1 | * | 5/2016 | Bintz ................ F02C 7/16 60/779 |

* cited by examiner

COOLING OF TURBINE ENGINE BY EVAPORATION

CROSS-REFERENCE TO RELATED APPLICATIONS

This application claims the benefit, under 35 U.S.C. § 119, of BE 2015/5167 filed Mar. 20, 2015, the disclosure of which is incorporated herein by reference in its entirety.

FIELD

The present disclosure relates to an axial turbine engine fitted with a cooling system. More specifically, in various embodiments the invention relates to a turbofan engine fitted with an air/oil cooling system in communication with the secondary flow. Additionally, in various embodiments the present disclosure relates to a method for managing a cooling system of a turbine engine.

BACKGROUND

During operation, an aircraft turbine engine releases a significant quantity of heat. The heat arises from the air compression and combustion, but also from friction in the gears of the power transmission units and in the bearings. The multiplicity of electrical equipment further increases this heating. It is also noted that certain operating phases, such as take-off, create additional heat.

The heat is transported from the heat sources to exchangers via a circuit using a heat-transmitting fluid. The lubricating oil is ideal for this function since it comes closely into contact with the hot sources and is then collected. Cooling typically takes place by the addition of an exchanger in which the collected oil circulates.

Typically, part of the heat is recovered for the useful functions of the aircraft such as defrosting, fuel preheating, cabin heating etc. The surplus heat is dissipated into the atmosphere via exchangers which transfer the heat from the heat-transmitting fluid to the air. The cooling performance is variable, depending on such things as the temperature difference between the heat-transmitting fluid and the air. Cooling may become critical in desert areas where the air temperature, expected to form a cold source, reaches 50° C. In addition, the thermal capacity of air is low.

Document US 2009/0007570 A1 discloses an axial turbine engine for an aircraft. The turbine engine comprises a turbine and a compressor which are lubricated by an oil circuit. Utilizing a heat exchanger, the circuit also allows cooling of the oil following the heating it undergoes while performing its lubrication function. The exchanger uses the air of the secondary flow passing through the turbine engine as a cold source. This arrangement benefits from a significant flow of incoming air and allows consequent cooling.

However, the cooler is bulky. In fact a cooler is normally dimensioned to meet the maximum need, taking into account certain operating margins and the possibility of incidents. Such a cooler becomes heavy and increases the drag of the turbine engine.

SUMMARY

An object of the invention is to solve at least one of the problems posed by the prior art. More precisely, an object of the invention is to reduce the size of an exchanger of a turbine engine. The invention also has an object of protecting the oil of a turbine engine.

It will be understood that an object of the invention is a turbine engine in contact with ambient air, the turbine engine comprising an oil circuit with a cooler, the cooler comprising a first heat exchange surface—as a hot surface—in contact with the oil of the oil circuit, and a second heat exchange surface—as a cold surface—in contact with the ambient air; distinguished in that the cooling system comprises a device for injecting cooling liquid onto the cooler, for example onto the second heat exchange surface.

The invention also comprises an axial turbine engine for aircraft intended to be in contact with at least one air flow, the turbine engine comprising an oil circuit with at least one cooler, the cooler comprising a first heat exchange surface in contact with the oil of the oil circuit, and a second heat exchange surface in contact with the air flow such that the cooler can cool the oil by means of the air flow; distinguished in that the cooler comprises a device for injecting cooling liquid, for example water, onto the second surface in order to cool it, to increase the cooling capacity of the oil when the liquid is injected.

According to various advantageous embodiments of the invention, the turbine engine comprises an external annular casing radially delimiting the airflow, the injection device being arranged axially at the level of the external casing.

According to various advantageous embodiments of the invention, the turbine engine comprises two annular flows, a primary flow and a secondary flow, wherein the turbine engine can comprise a fan.

According to various advantageous embodiments of the invention, the injection device comprises one or more injection means configured to inject liquid onto the second surface, the injection means being placed upstream of the second surface or axially at the level of the upstream half of the second surface.

According to various advantageous embodiments of the invention, the cooler comprises cooling fins forming the second surface, the injection device comprising the injection means configured to inject liquid onto the fins.

According to various advantageous embodiments of the invention, the injection device comprises the injection means, such as injection openings, wherein in various implementations each injection means is arranged axially downstream of the fan, wherein the injection means can be arranged in a circle.

According to various advantageous embodiments of the invention, the turbine engine comprises an annular vein guiding the air flow and a passage with an inlet and an outlet, both in communication with the annular vein, the cooler being placed in the passage.

According to various advantageous embodiments of the invention, the turbine engine comprises an exhaust, the turbine engine being configured to evacuate the liquid from the turbine engine via the exhaust.

According to various advantageous embodiments of the invention, the turbine engine comprises means for supplying the liquid, and can also comprise a liquid reservoir.

According to various advantageous embodiments of the invention, the turbine engine comprises a convergent-divergent nozzle, the cooler being placed upstream of the nozzle.

According to various advantageous embodiments of the invention, the cooler has an annular form, wherein the cooler can surround the air flow.

According to various advantageous embodiments of the invention, the turbine engine comprises a body with a cooling coil in communication with the oil circuit, wherein the body can be a vane or a defrosting tip of the turbine engine.

According to various advantageous embodiments of the invention, the turbine engine comprises at least one actuator controlled by the oil pressure of the oil circuit, wherein in various implementations it comprises a pump pressurizing the oil towards the actuator.

According to various advantageous embodiments of the invention, the turbine engine comprises a reducing gear, e.g., in various implementations an epicyclic reducing gear, which is lubricated by the oil of the oil circuit, wherein the turbine engine can comprise a fan and/or a compressor, the reducing gear connects the fan and/or the compressor in rotation.

According to various advantageous embodiments of the invention, the turbine engine comprises an oil temperature sensor able to measure the temperature of the oil in the oil circuit, wherein the injection device can be configured to inject liquid onto the second surface as soon as the sensor detects that the oil temperature exceeds a temperature threshold TS.

According to various advantageous embodiments of the invention, the turbine engine is a turbofan engine.

According to various advantageous embodiments of the invention, the heat cooler is placed outside the primary flow and/or inside the secondary flow.

According to various advantageous embodiments of the invention, the oil is a cooling oil.

According to various advantageous embodiments of the invention, the turbine engine comprises a compressor and a combustion chamber, the cooler being placed axially at the level of the compressor and/or the combustion chamber.

According to various advantageous embodiments of the invention, the turbine engine comprises at least one or a plurality of bearings lubricated by the oil of the oil circuit.

According to various advantageous embodiments of the invention, the oil circuit is a closed circuit, wherein the oil circuit can comprise parallel loops.

According to various advantageous embodiments of the invention, the cooler comprises a layer of material, e.g., a solid layer of material, arranged between and/or forming and/or connecting the first surface and the second surface. The layer forms a sealed barrier between the surfaces.

In various embodiments invention provides a method for cooling a turbine engine of an aircraft comprising an oil circuit with the cooler adapted to cool the oil of the oil circuit, distinguished in that on take-off of the aircraft, liquid, for example water, is injected onto the cooler of the turbine engine.

According to various advantageous embodiments of the invention, the cooler is an air/oil cooler.

According to various advantageous embodiments of the invention, the liquid is injected when the rotation speed acceleration of the turbine engine exceeds a threshold AR.

According to various advantageous embodiments of the invention, the liquid is injected as long as the altitude of the turbine engine remains below an altitude threshold AS.

According to various advantageous embodiments of the invention, the liquid is injected as long as the temperature of the lubricating oil of the turbine engine exceeds a threshold TS.

According to various advantageous embodiments of the invention, on injection, the liquid is configured so that it can evaporate on contact with the cooler during operation of the turbine engine.

In general, the advantageous embodiments of each object of the invention are also applicable to the other objects of the invention. As far as possible, each object and each advantageous embodiment can be combined.

The invention proposes additional cooling which is particularly beneficial under maximum stress. The invention utilizes the endothermic properties of the liquid (e.g., water), e.g., the transformation into vapour, to evacuate heat during temperature peaks. The presence of liquid affects the mass on take-off, however this presence remains transitory. However, the benefit of compactness remains throughout cruising flight.

Oil is temperature-sensitive and can heat and degrade rapidly. The temperature development of the oil affects its performance and harms its lubricating capacity. The invention therefore allows control of the oil temperature, and hence, preservation of its lubricating qualities, while controlling its mechanical properties such as corrosivity.

The provision of cooling by additional liquid with rapid action allows control of the oil temperature and intervention in the turbine engine in the case of incident, for example in the case of engine overheating, for example, in the case of fire.

DRAWINGS

DETAILED DESCRIPTION

In the description below, the terms internal or inner and external or outer relate to positioning relative to the axis of rotation of an axial turbine engine.

Figure 1:
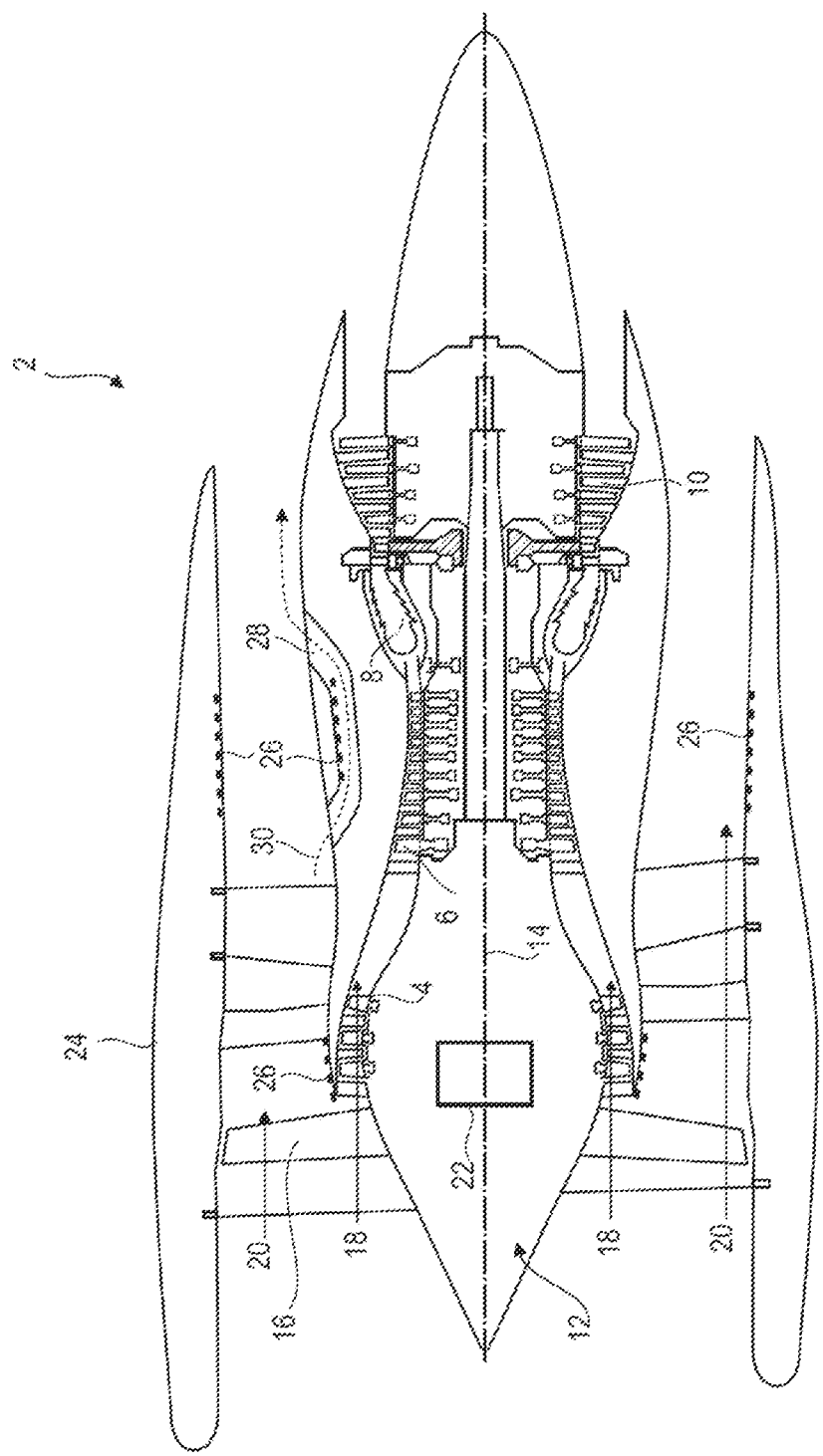
FIG. 1 shows an axial turbine engine, according to various embodiments of the present invention.

FIG. 1 shows in simplified form an axial turbine engine 2. In various exemplary embodiments, the axial turbine engine 2 is a turbofan engine. The turbofan engine 2 comprises a first compression level called the low-pressure compressor 4, a second compression level called the high-pressure compressor 6, a combustion chamber 8, and one or more levels of turbines 10. In operation, the mechanical power of the turbine(s) 10 transmitted via the central shaft to the rotor 12 sets the two compressors 4 and 6 in motion. The latter comprise several rows of rotor vanes associated with rows of stator vanes. Rotation of the rotor 12 around its rotation axis 14 thus allows generation of an air flow and its progressive compression up to the inlet to the combustion chamber 8.

The turbine engine 2 meets an ambient air flow. An inlet fan 16 or blower 16 is coupled to the rotor 12 and generates an air flow which is divided into a primary flow 18 passing through the various above-mentioned levels of the turbine engine 2, and a secondary flow 20 passing through an annular conduit along the engine 2 to then re-join the primary flow 18 at the outlet from the turbine 10. The secondary flow 20 can be accelerated so as to create a thrust reaction. The primary flow 18 and secondary flow 20 are annular flows, they are ducted by the casing of the turbine engine. To this end, the casing has cylindrical walls or shrouds which can be internal and external. In particular, the secondary flow 20 is ducted by an external casing 24, generally forming an annular wall. This external casing can be the nacelle 24.

In order to decouple the fan from the low-pressure compressor and the turbine driving it, the turbine engine has a transmission 22 such as a reducing gear 22. This allows a reduction in the rotation speed of the fan 16 relative to the downstream compressor. In this way, the different rotating parts can adopt separate and optimal rotation speeds while being driven by the same shaft. Despite this advantage, the presence of a transmission is not essential to the invention.

The turbine engine 2 comprises an oil circuit allowing lubrication of the various items of equipment, the bearings, the transmission 22, etc., where fitted. This oil also promotes their cooling since it forms a heat-transmitting fluid which circulates close to hot points, and is then collected and cooled. To this end, the turbine engine 2 comprises at least one oil cooler 26, where applicable a plurality of coolers 26. For exemplary purposes, three coolers 26 are shown, one of which is outside the secondary flow in the external casing 24, and one on the separation tip 32 of the low-pressure compressor 4. At the latter location, the cooler can perform a defrosting function. At least one or each cooler 26 can be circular, and surround the rotation axis 14 or the primary flow 18 and in some cases the secondary flow 20. Other numbers of coolers 26 could be considered.

At least one or each cooler 26 can be a surface exchanger or a block exchanger that has several superimposed, parallel oil circulation levels and/or air circulation levels.

The turbine engine can have a passage 28 forming a branch parallel to the secondary vein which conducts the secondary flow 20. This passage 28 has an inlet and an outlet in communication with the secondary vein, which allows ducting of a fraction 30 of the secondary flow 20. A cooler 26 can be placed in this passage 28 in order to use this fraction 30 as a cold source.

At the level of the cooler 26 of the separation tip 32, the turbine engine 2 can comprise a convergent-divergent nozzle. The cooler is placed upstream of the nozzle which is configured to optimize thrust.

The turbine engine 2 can comprise at least one actuator such as a hydraulic ram. The hydraulic actuator is controlled by the oil pressure. To give mechanical energy to the oil, the turbine engine 2 has a pump such as a volumetric pump.

Figure 2:
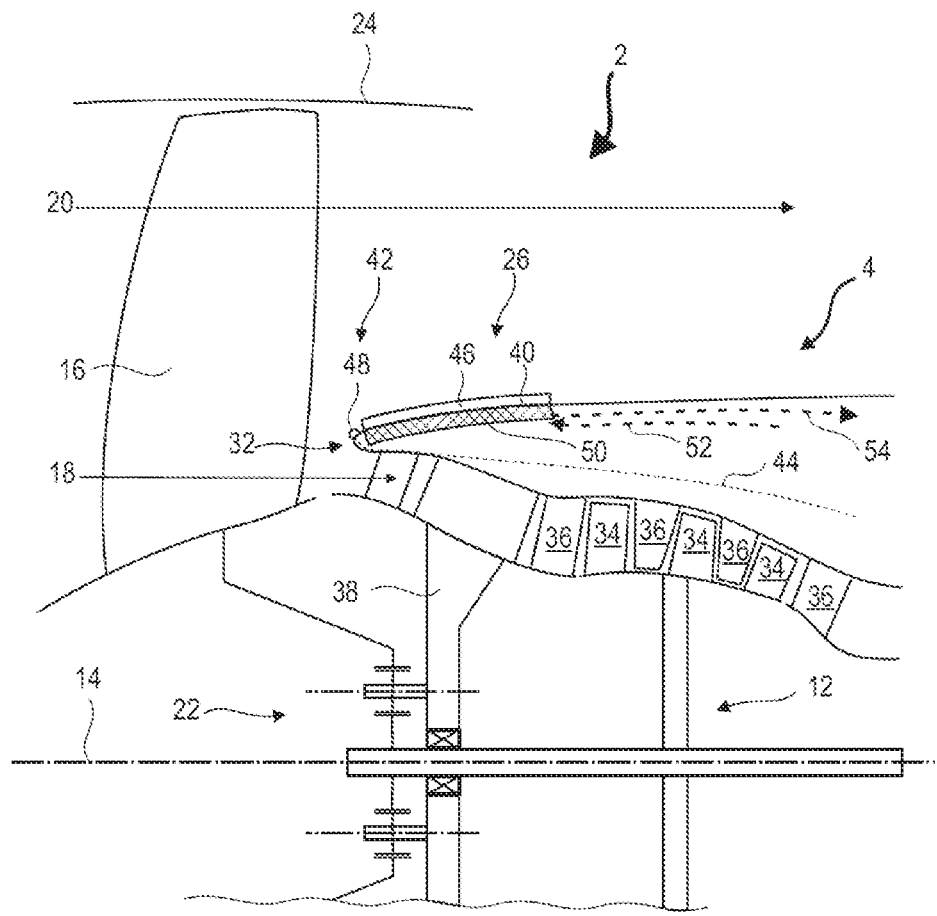
FIG. 2 is a diagram of a portion of a turbine engine centred on a compressor, according to various embodiments of the present invention.

FIG. 2 is a cross-section view of a compressor of an axial turbine engine 2 such as that shown in FIG. 1. In various embodiments, the compressor can be the low-pressure compressor 4. Here part of the fan 16 and the separation tip of 32 of the primary flow 18 and secondary flow 20 are shown. The separation tip 32 receives a cooler 26, the characteristics of which (shown below) can also apply to the other coolers 26.

The rotor 12 comprises several rows of rotor vanes 34, exemplarily in this case three. However, the rotor 12 can comprise more rows of vanes 34. The rotor vanes 34 can be installed on a drum of the compressor 4, the latter being connected to the fan 16 via the reducing gear 22. The reducing gear 22 exemplarily shown here is of the epicyclic type, with satellites mounted on the stator 38 of the turbine engine 2. However, any other type of reducing gear and architecture is conceivable.

The low-pressure compressor 4 comprises several diffusers, exemplarily shown here having four, which each contain a row of stator vanes 36. The diffusers are associated with the fan 16 or with a row of rotor vanes 34, to diffuse the air flow 18 so as to convert the speed of the flow into a static pressure.

The cooler 26 comprises a first heat exchange surface in contact with the oil of the oil circuit to be cooled. It also comprises a second heat exchange surface 40 in contact with the secondary air flow 20 passing through the turbine engine. The second surface 40 can also be in contact with the air surrounding the external casing 24. This secondary flow 20 absorbs the heat from the cooler 26 and lowers the temperature of the oil. That is, it acts as a cold source in cooling the oil, which is here regarded as the hot source.

To increase the performance of the cooler 26, a device 42 for injecting cooling liquid is attached thereto. The liquid is sprayed towards the second surface 40 to make contact therewith, which amplifies the cooling by the air. The secondary flow 20 can deposit liquid on the second surface 40. Since the latter is normally in contact with the air flow 20, the spray is partially or largely deposited thereon. Thus, the oil is cooled further and more quickly. The extent or useful area of the first heat exchange surface in contact with the oil can be reduced. In various implementations, the liquid can comprise additives to improve its thermal capacity. In various embodiments, it can comprise mostly water.

The liquid can have a boiling temperature for example lower than the temperature of the second surface 40 in operation of the turbine engine 2, in various implementations when the aircraft is on the ground. In light of this property, the liquid changes phase and becomes gaseous, for example vapour. This change of phase is accompanied by an absorption of energy, i.e., heat. This thermodynamic reaction further cools the cooler 26. The boiling temperature can be equal to 100° C.

The turbine engine 2 has an exhaust at the outlet from the turbine and is configured to evacuate liquid via the exhaust. By evacuating the liquid into the exhaust flow, the thrust of the turbine engine 2 is increased. Thus, for the same thrust, the exhaust can become smaller, the need for cooling reduces together with the necessary size of cooler 26.

To provide the liquid, the turbine engine 2 can comprise liquid supply means such as pipes 44, and in various instances, a liquid reservoir (not shown). However, the reservoir can be specific to the aircraft and supply a plurality of turbine engines 2.

The cooler 26 comprises cooling fins 46 which form, supplement and extend the second surface 40. These fins 46 can extend radially from the wall delimiting the secondary flow. Presence of the fins 46 increases the available exchange surface area, which improves the cooling capacity. The separation tip 32, the oil circuit and the fins 46 can correspond to those of document EP2075194A1.

In various embodiments, the injection device 42 can comprise one or more injection means 48 configured to inject liquid onto the second surface 40. The injection means 48 can comprise or be openings 48, nozzles 48, etc. The injection means 48 can atomize the liquid in the form of droplets or in the form of veins. Advantageously, the injection means 48 are placed upstream of the second surface 40. Alternatively, they are arranged axially at the level of the upstream half, or upstream third or upstream quarter, of the second surface 40.

Each injection means 48 can comprise a portion protruding relative to the second surface 40. The injection means 48 can be configured to inject liquid onto the fins 46. In various embodiments, each injection means 48 is arranged axially downstream of the fan 16, wherein the injection means 48 can be distributed over a circle. The injection means 48 can be distributed over a tubular surface to cool the second surface 40 homogeneously.

The separation tip 32 can form a solid body. The turbine engine 2 can comprise a cooling coil 50 in communication with the oil circuit. The coil 50 can form a series of bends to increase the circulation length of the oil over the same surface area, which increases the effective heat exchange. In various embodiments, the cooler 26 comprises supply means such as a hot inlet pipe 52 and a cold outlet pipe 54 which returns the oil to the equipment or reservoir.

In various embodiments, the turbine engine 2 can comprise a temperature sensor (not shown) for the oil in the circuit. The injection device 42 can be configured to inject liquid onto the second surface 40 as soon as the sensor detects that the oil temperature exceeds a temperature threshold TS.

Figure 3:
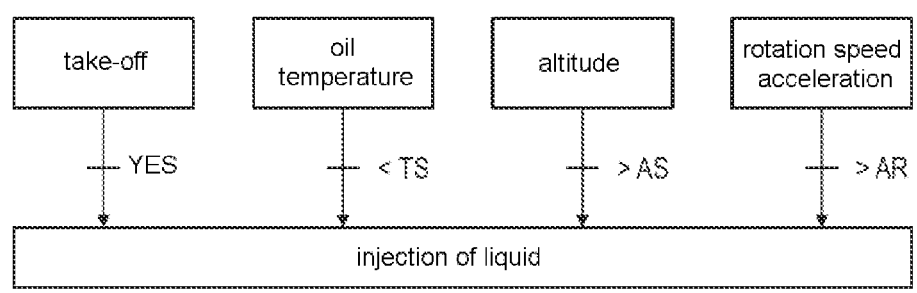
FIG. 3 illustrates a diagram of the method for cooling the turbine engine, according to various embodiments of the present invention.

FIG. 3 depicts a diagram of the method for cooling the turbine engine 2. The turbine engine 2 can correspond to that shown in FIG. 1. The method allows control of at least one or each cooler 26 of the turbine engine 2 autonomously or separately.

The turbine engine comprises an oil circuit and an oil cooler 26 as presented above. The method provides the injection of cooling liquid onto the cooler 26, the second surface 40 thereof, when or as soon as one injection condition is fulfilled. For example, the method can provide that cooling liquid is injected during take-off of the aircraft.

Instead of or in addition to this condition, the method can provide for injection of the liquid as a function of the development in the rotation speed of the rotor 12 of the turbine engine 2. As soon as the rotation speed acceleration of the turbine engine 2 exceeds a threshold AR, liquid is injected for cooling.

An altitude condition can be taken into account for controlling the injection. Since the temperature of the ambient air falls at altitude, above an altitude threshold AS, additional cooling by liquid is no longer necessary. Thus, the injection device 42 injects liquid as long as the altitude of the turbine engine 2 remains below an altitude threshold AS. As soon as the altitude threshold AS is exceeded, injection stops.

The ambient temperature and/or oil temperature can be taken into account. As soon as the temperature of the lubricating oil of the turbine engine exceeds a temperature threshold TS, water is injected.

Optionally, several combined conditions must be fulfilled for the injection of liquid. The combination of conditions can include altitude, engine speed and/or rotation speed acceleration.

According to the method, the cooler 26 is an air/oil cooler. Advantageously, the liquid corresponds to that presented above.

What is claimed is:

1. An axial turbine engine for an aircraft, intended to be in contact with an air flow, the turbine engine comprising:
   an axis;
   an annular primary flow;
   an annular secondary flow;
   a circular separation tip separating an air flow into the annular primary flow and the annular secondary flow;
   an oil circuit with at least one cooler, the cooler comprising:
      a first heat exchange surface in contact with oil of the oil circuit;
      a second heat exchange surface in contact with the annular secondary flow in order to cool the oil by the annular secondary flow, the second heat exchange surface being annular around said axis; and
      an injection device structured and operable to inject a cooling liquid onto the second heat exchange surface in order to cool it, wherein the device comprises a plurality of nozzles arranged at the circular separation tip upstream of the second heat exchange surface, the nozzles being arranged circularly and distributed around the axis, each nozzle comprising an opening aligned with the second heat exchange surface along the axis,
   wherein the cooler comprises cooling fins extending radially from the second heat exchange surface, the nozzles being further configured to inject the cooling liquid onto the cooling fins,
   the turbine engine further comprising a plurality of pipes for respectively supplying the cooling liquid to the nozzles, the pipes extending substantially parallel to the axis and arranged between the annular primary flow and the annular secondary flow.

2. The turbine engine of claim 1 further comprising an external annular casing radially delimiting the airflow, wherein the injection device is arranged axially at the level of the external casing.

3. The turbine engine of claim 1 further comprising an exhaust, the turbine engine being structured and operable to evacuate the cooling liquid from the turbine engine via the exhaust.

4. The turbine engine of claim 1 further comprising a body with a cooling coil in communication with the oil circuit, wherein the body can be at least one of a vane and a defrosting tip of the turbine engine.

5. The turbine engine of claim 1 further comprising at least one actuator controlled by oil pressure of the oil circuit, and a pump pressurizing the oil towards the actuator.

6. The turbine engine of claim 1 further comprising an oil temperature sensor structured and operable to measure a temperature of the oil in the oil circuit, wherein the injection device can be structured and operable to inject the cooling liquid onto the second heat exchange surface when the sensor detects that the oil temperature exceeds a temperature threshold TS.

7. The turbine engine of claim 1 further comprising a fan, and a reducing gear that is lubricated by the oil of the oil circuit, the reducing gear connecting the fan and the compressor.

* * * * *